US010926406B2

(12) United States Patent
Prüssmeier et al.

(10) Patent No.: US 10,926,406 B2
(45) Date of Patent: Feb. 23, 2021

(54) ROBOT, XY TABLE FOR A ROBOT AND LINEAR TRANSPORT SYSTEM

(71) Applicant: BECKHOFF AUTOMATION GMBH, Verl (DE)

(72) Inventors: Uwe Prüssmeier, Lemgo (DE); Armin Pehlivan, Nüziders (AT); Christian Henke, Feldkirch (AT); Stefan Sonderegger, Nüziders (AT); Thomas Morscher, Vienna (AT); Clemens Maier, Bludenz (AT)

(73) Assignee: Beckhoff Automation GmbH, Verl (DE)

( * ) Notice: Subject to any disclaimer, the term of this patent is extended or adjusted under 35 U.S.C. 154(b) by 120 days.

(21) Appl. No.: 15/941,722

(22) Filed: Mar. 30, 2018

(65) Prior Publication Data

US 2018/0222042 A1 Aug. 9, 2018

Related U.S. Application Data

(63) Continuation of application No. PCT/EP2016/073266, filed on Sep. 29, 2016.

(30) Foreign Application Priority Data

Oct. 2, 2015 (DE) ...................... 10 2015 116 808.1

(51) Int. Cl.
*B25J 9/10* (2006.01)
*B25J 5/02* (2006.01)
(Continued)

(52) U.S. Cl.
CPC .............. *B25J 9/106* (2013.01); *B25J 5/005* (2013.01); *B25J 5/02* (2013.01); *B25J 9/009* (2013.01);
(Continued)

(58) Field of Classification Search
CPC ..... B25J 9/106; B25J 5/005; B25J 5/02; B25J 9/0045; B25J 9/009; B25J 9/0093;
(Continued)

(56) References Cited

U.S. PATENT DOCUMENTS 6,186,024 B1 * 2/2001 Leiber ..................... B23Q 1/56
108/143
6,428,267 B1 * 8/2002 Terpstra .................. B23Q 1/56
212/319

(Continued)

FOREIGN PATENT DOCUMENTS

CN 101437427 A 5/2009
CN 103308338 A 9/2013
(Continued)

OTHER PUBLICATIONS

Beckhoff Automation GmbH & Co. KG, "XTS: Innovation Potential—from Motion Tasks to Intelligent Industry 4.0 Elements," PC Control 02, 2015 (4 pages).

(Continued)

*Primary Examiner* — Joseph Brown
(74) *Attorney, Agent, or Firm* — Dorsey & Whitney LLP

(57) ABSTRACT

A robot for a linear transport system includes a carriage guide rail and first and second XY tables, each with first and second carriages arranged to move independently on the carriage guide rail, and first and second linear guides, each having first and second guide elements which can be moved relative to one another and are configured with an angular offset. The first guide elements of the first and second linear guides are connected via a support structure. The second guide elements of the first and second linear guides are connected to the first and second carriages. The robot can include first and second arm systems connected to one another via an articulated system, with an attached work tool. The first and second arm systems can connect to the (Continued)

support structures of the first and second XY tables via corresponding first and second joints.

11 Claims, 15 Drawing Sheets

(51) Int. Cl.
*B25J 5/00* (2006.01)
*B25J 9/00* (2006.01)
*B65G 54/02* (2006.01)

(52) U.S. Cl.
CPC .......... *B25J 9/0093* (2013.01); *B25J 9/1065* (2013.01); *B65G 54/02* (2013.01); *Y10S 901/02* (2013.01); *Y10S 901/27* (2013.01)

(58) Field of Classification Search
CPC ..... B25J 9/1065; B25J 15/0095; B65G 54/02; B65G 47/22; B65G 47/912; B65G 47/914; B65G 47/901; B65G 47/902; B65G 47/94; B65G 47/96; B65G 47/967; B23Q 1/4852; B23Q 1/4877
USPC ...... 74/490.08, 490.09; 901/7; 409/206, 211
See application file for complete search history.

(56) References Cited

U.S. PATENT DOCUMENTS

| | | | |
|---|---|---|---|
| 7,124,660 B2 * | 10/2006 | Chiang | A47B 91/16 74/490.05 |
| 8,099,188 B2 * | 1/2012 | Brogardh | B23Q 1/5462 700/245 |
| 2005/0263369 A1 * | 12/2005 | Mendenhall | B65G 35/06 198/370.01 |
| 2010/0047051 A1 * | 2/2010 | Knobel | B25J 9/1065 414/751.1 |
| 2015/0008768 A1 * | 1/2015 | Achterberg | H01H 1/50 310/12.11 |
| 2016/0114442 A1 * | 4/2016 | Possamai | B25J 9/106 248/277.1 |

FOREIGN PATENT DOCUMENTS

| | | | |
|---|---|---|---|
| CN | 104589334 A | | 5/2015 |
| DE | 19525482 A1 | | 1/1997 |
| DE | 10128185 B4 | | 3/2005 |
| DE | 102012201059 A1 | | 7/2013 |
| DE | 102012204919 A1 | | 10/2013 |
| DE | 102013206125 A1 | | 10/2014 |
| JP | 2011125950 A | | 6/2011 |
| KR | 20030006756 A | * | 1/2003 |
| KR | 20030013868 A | * | 2/2003 |
| KR | 20100117316 A | * | 11/2010 |
| WO | 9932256 A1 | | 7/1999 |
| WO | 2005110898 A2 | | 11/2005 |

OTHER PUBLICATIONS

English translation of German patent No. DE19525482A1 to Richerzhagen, issued Jan. 16, 1997, 2 pages.
English translation of German patent No. DE19525482A1 to Richerzhagen, issued Jan. 16, 1997, obtained Aug. 7, 2020 from espacenet.com, 6 pages.
First Office Action dated Sep. 1, 2020 in connection with Chinese Patent Application No. 2016800645497.2, 9 pages including English translation.

* cited by examiner

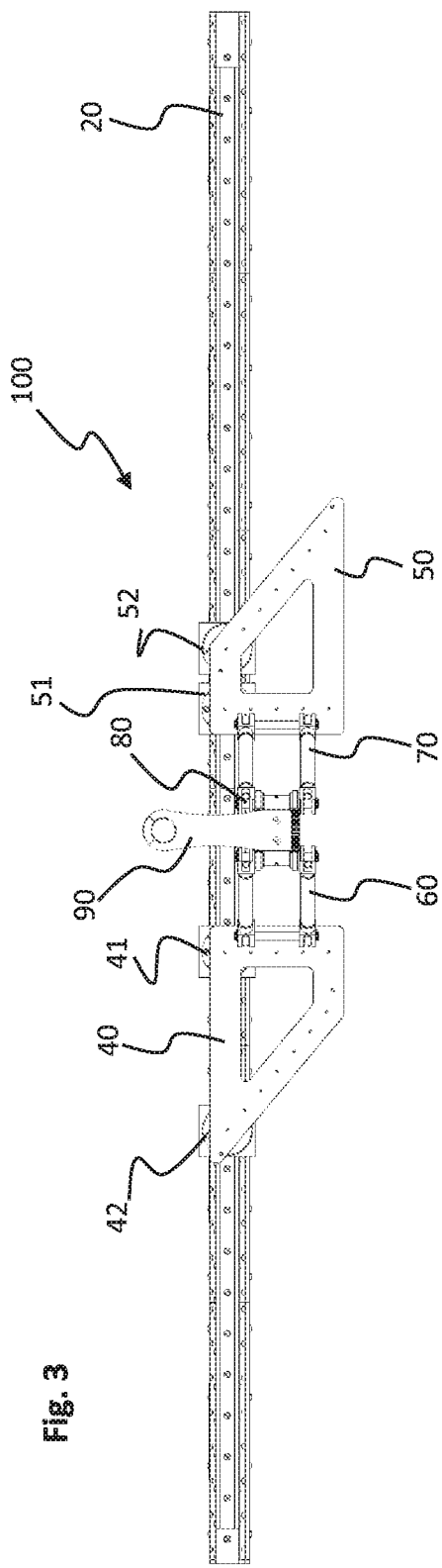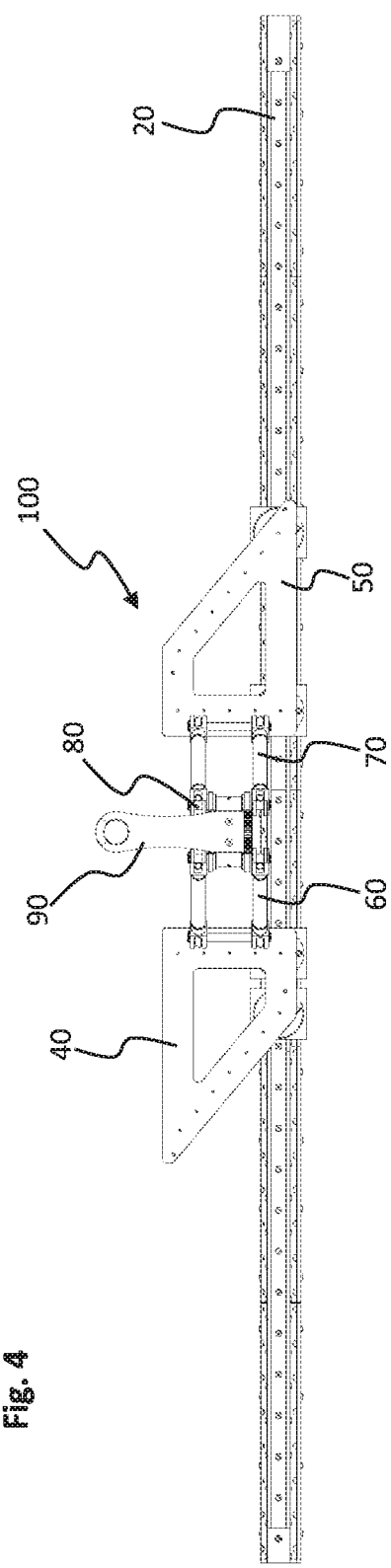

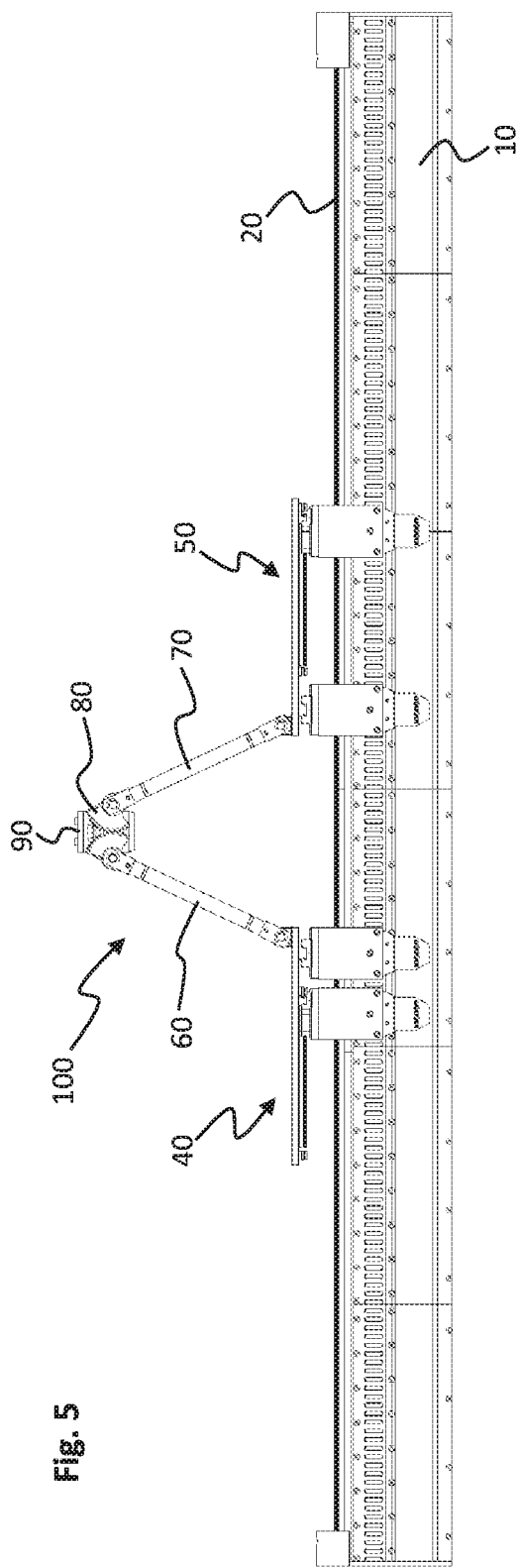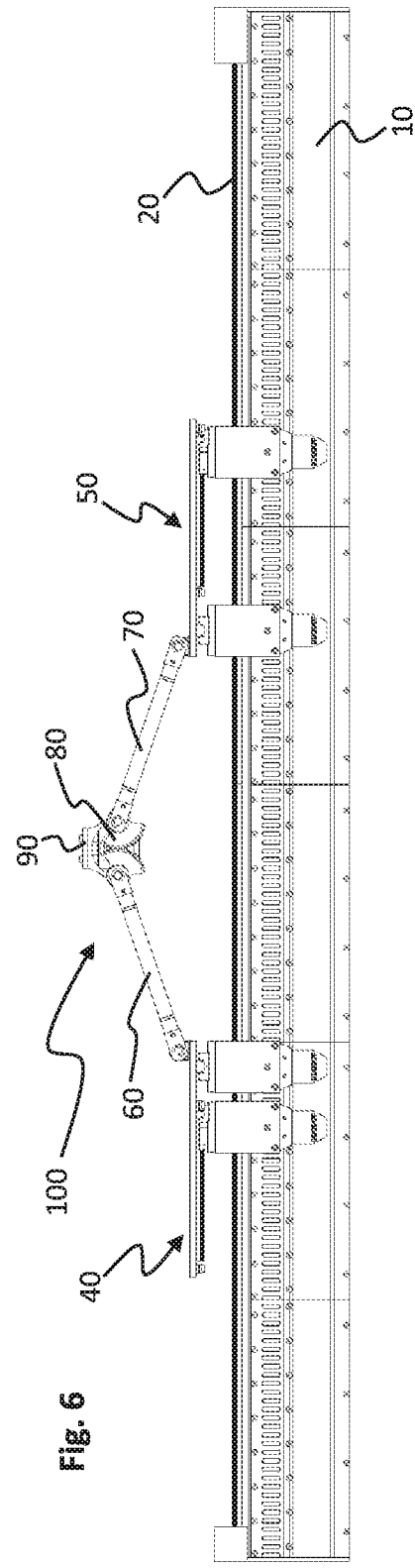
Fig. 5
Fig. 6

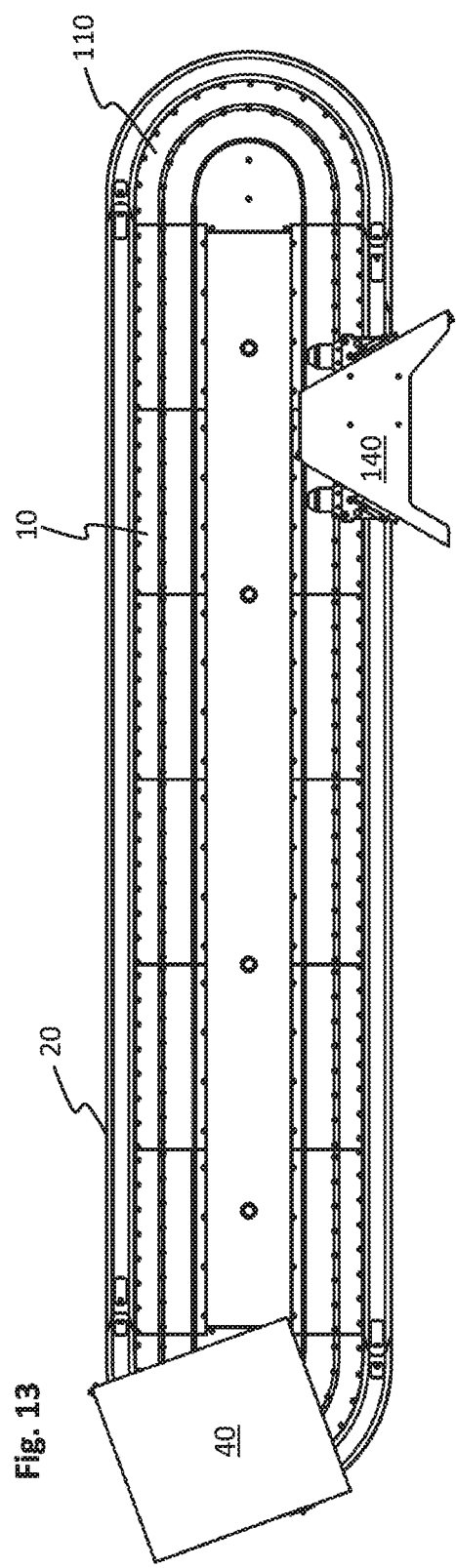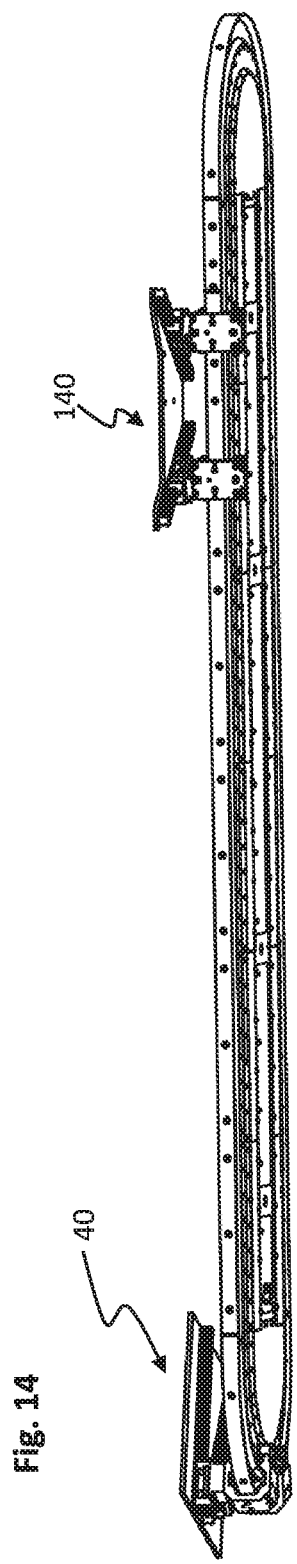

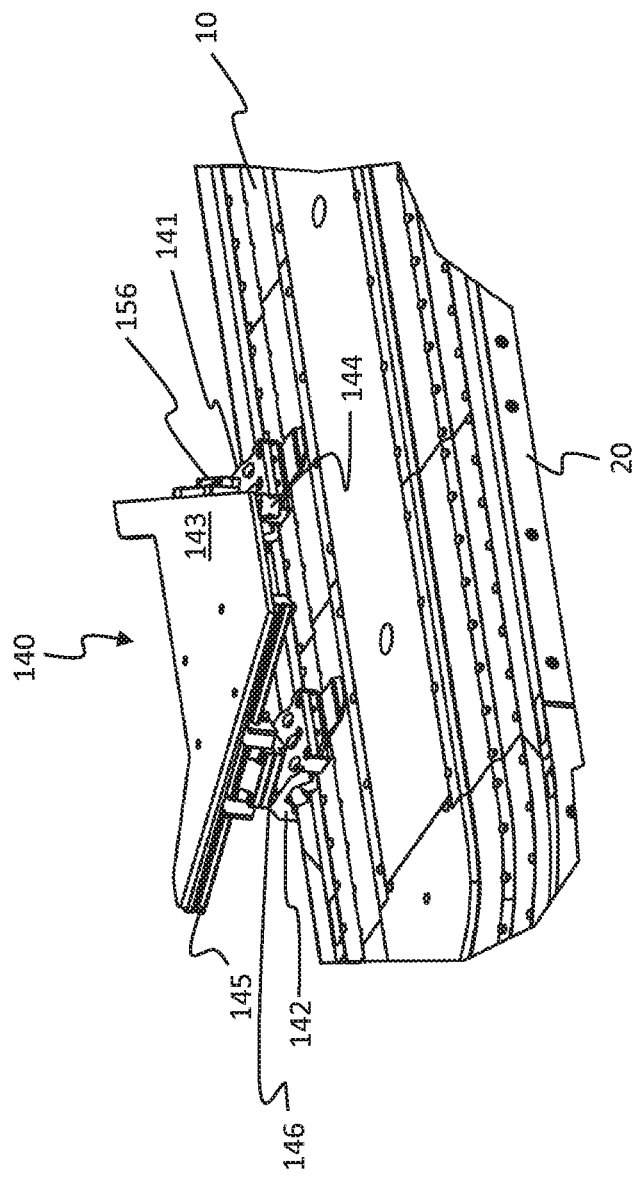

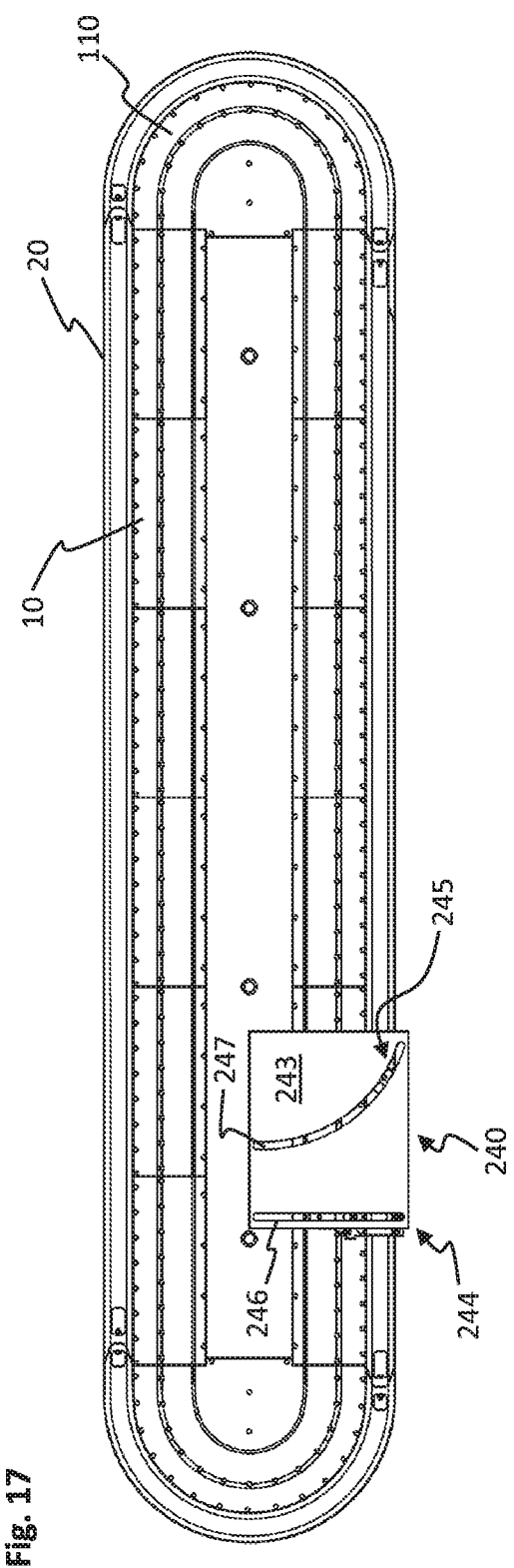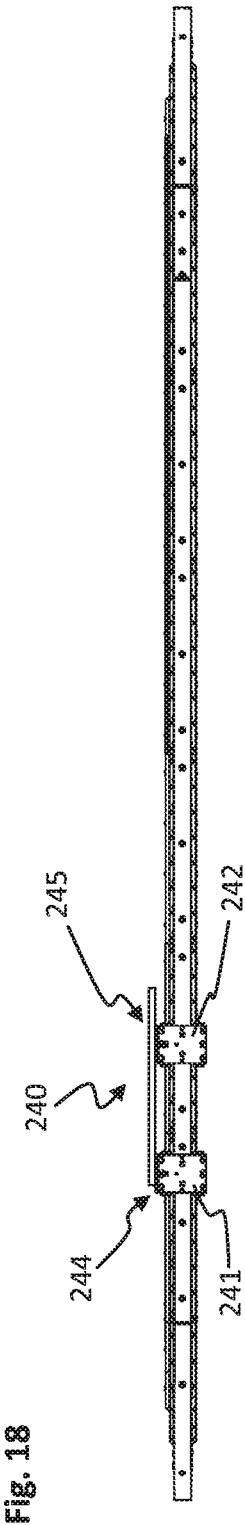

ROBOT, XY TABLE FOR A ROBOT AND LINEAR TRANSPORT SYSTEM

CROSS-REFERENCE TO RELATED APPLICATIONS

This patent application is a continuation of International Patent Application No. PCT/EP2016/073266, filed Sep. 29, 2016, which claims priority to German patent application DE 10 2015 116 808.1, filed Oct. 2, 2015, entitled ROBOTER, XY-TISCH FÜR EINEN SOLCHEN ROBOTER UND LINEARES TRANSPORT SYSTEM, which is incorporated by reference herein, in the entirety and for all purposes.

FIELD

The invention relates to a robot for a linear transport system comprising a carriage guide rail, to an XY table for a robot, designed to travel along a carriage guide rail of a linear transport system, wherein the carriage guide rail comprises an arc section, and to a linear transport system comprising a carriage guide rail having an arc section and comprising a robot, which comprises a first and a second XY table.

BACKGROUND

Increasing use is being made of linear drive concepts as transport systems in production and manufacture and, in these drive concepts, a number of transport carriages can be controlled and moved independently of one another on a movement path, thereby making it possible to achieve high flexibility in the flow of production. It has proven advantageous in the design of linear transport systems to form the movement path from energizable magnetic field producers, on which the transport carriages travel passively without cables. A linear transport system of this kind is described, inter alia, in DE 10 2012 204 919 A1.

In linear transport systems, however, only movement of the transport carriages in the direction of the movement path is possible. In a production and manufacturing process, however, a multi-dimensional movement is generally necessary for the positioning of workpieces, especially in the area of processing stations. To remove and introduce workpieces in linear transport systems, the processing stations therefore have multiaxis robots, but this is very costly.

As an alternative, there is also the possibility of configuring the transport carriages of the linear transport system as multiaxis robots. However, in order to implement a robot that can perform a multi-dimensional movement on a transport carriage, it is then necessary to provide additional axle drives on the transport carriage. However, this then has the consequence that the carriage requires a power supply and can no longer be configured passively without cables.

DE 101 28 185 B4, JP 2011-125950 and DE 10 2012 201 059 A1 each disclose handling devices for a linear transport system which have two arm systems connected to one another in an articulated manner, wherein each arm system is assigned one carriage, wherein the carriages can be controlled and moved independently of one another. By synchronous movement of the two carriages, the handling device can be moved along the carriage guide rail in the x direction. By means of a movement of the two carriages relative to one another, during which the distance between the carriages is modified, the handling device can then additionally perform a movement in the z direction perpendicularly to the carriage guide rail. However, the movement of the robot is restricted to two directions, the x and the z direction.

In order to enable positioning of the robot in the third spatial direction as well, the y direction, there is a proposal in DE 195 25 482 A1 to provide, parallel to the carriage guide rail, a further carriage guide rail, on which a further carriage, which carries a further arm system coupled to the two other arm systems, can be moved. With this configuration, there is the possibility of performing a three-dimensional movement of the robot.

There is a proposal in DE 10 2013 206 125 A1 for a similar transport system, in which two closed carriage guide rails arranged parallel to one another are provided. The handling device has two carriage pairs that can be controlled independently of one another and have arm systems, each assigned to one carriage guide rail.

SUMMARY

The invention provides a robot for a linear transport system having a single carriage guide rail, by means of which a three-dimensional movement can be performed. The invention further provides an XY table for a robot, which table is designed to travel along a carriage guide rail having an arc section. The invention further provides a linear transport system for a robot and an XY table.

EXAMPLES

The robot for a linear transport system having a carriage guide rail has a first and a second XY table as a base plate. Each XY table comprises a first and a second carriage, which are each arranged in such a way as to be movable independently of one another on the carriage guide rail. Furthermore, a first and a second linear guide are provided, which are configured with an angular offset with respect to one another. Each linear guide has a first and second guide element, wherein the first guide elements are connected to one another via a support structure. The second guide element of the first linear guide is connected to the first carriage, and the second guide element of the second linear guide is connected to the second carriage. The robot furthermore has a first and a second arm system, which are connected to one another via an articulated system, wherein a work tool is arranged on the articulated system. The first arm system is connected to the support structure of the first XY table via a first joint, and the second arm system is connected to the support structure of the second XY table via a second joint.

By means of this robot configuration, it is possible, by means of four carriages, which are arranged on a single carriage guide rail, to perform a three-axis movement of the work tool, in which any desired position in a three-dimensional workspace can be adopted. In this arrangement, the two XY tables forming the base plate of the robot can perform a movement in the x and y directions. By synchronous movement of the four carriages carrying the two XY tables, the robot can be moved along the carriage guide rail, i.e. in the x direction. By means of a movement relative to one another of the two carriages, each carrying one XY table, during which the distance between the carriages is modified, the support structure of the XY table can be moved transversely to the carriage guide rail, i.e. in the y direction. The two XY tables of the robot thus define a two-dimensional workspace which is determined by the length of the carriage guide rail on which the carriages are moved and the length of the linear guides of the two XY tables. By means of a movement of the two XY tables relative to one another, a movement of the work tool carried by the arm systems can then be performed perpendicularly to the carriage guide rail, i.e. in the z direction, by modifying the coupling angle of the two arm systems. Here, the size of the workspace in the z direction is determined by the length of the arm systems.

The robot is of simple construction and can be produced at low cost. In particular, just a single carriage guide rail with transport carriages that can be of passive, cable-free design is required. The robot can be used in a production and manufacturing process in which positioning of workpieces in a three-dimensional workspace is required while, at the same time, transport over a relatively long distance can be performed.

According to one embodiment of the robot, the first joint, by means of which the first arm system is connected to the support structure of the first XY table, and the second joint, by means of which the second arm system is connected to the support structure of the second XY table, are each mounted so as to be rotatable relative to the support structure. By means of this embodiment of the robot, a further degree of freedom of movement can be achieved by an additional rotary motion. An additional rotary motion of the work tool carried by the two arm systems can be performed by opposed movement of the XY tables carrying the two arm systems transversely to the carriage guide rail.

According to another embodiment, the first and the second arm system of the robot are each configured as a two-dimensional object forming a surface. The articulated system which connects the first arm system and the second arm system has a first joint for connection to the first arm system and a second joint for connection to the second arm system. Here, the first joint and the second joint are connected to one another by a coupling device, preferably a gear mechanism. By means of this robot configuration, a stable position of the work tool carried by the articulated system is achieved in a simple manner. In particular, tilting of the work tool transversely to the guide rail is prevented.

According to another embodiment of the robot, the first and the second arm system are each configured as a three-dimensional object which in each case has a three-point connection to the articulated system and the support structure of the associated XY table. By means of this configuration too, a stable position of the work tool carried by the articulated system can be achieved.

An XY table for a robot is designed to travel along a carriage guide rail which has an arc section. The XY table has a first and a second carriage, which are each arranged in such a way as to be movable independently of one another on the carriage guide rail. Furthermore, a first and a second linear guide are provided, which are arranged at an angular offset with respect to one another and each have a first and a second guide element, which are designed to be moved relative to one another along a path. Here, the first guide elements of the first and the second linear guide are connected to one another via a support structure. The second guide element of the first linear guide is furthermore connected to the first carriage, and the second guide element of the second linear guide is connected to the second carriage. Here, the connection between the first and/or the second linear guide and the associated carriage and/or the support structure is of rotatable configuration.

By means of this configuration of the XY table, which can be used as a base plate of a robot, movement along any desired curved carriage guide rail, including, in particular, a closed carriage guide rail, can be performed. With the provision of an additional joint on the XY table, there is the possibility of traveling along a curved path. At the same time, a compact construction is achieved.

According to one embodiment, the first guide elements of the first and the second linear guide are each configured as guide rails and the second guide elements of the first and the second linear guide are each configured as sliding elements. The sliding element of the first linear guide and/or of the second linear guide is/are connected rotatably to the associated carriage. With this configuration, there is the possibility of curved travel of the XY table, during which the support structure is moved while being accurately positioned relative to the carriage guide rail.

According to another embodiment, the guide rail of the first and/or the second linear guide is embodied as a slot, wherein the associated sliding element is mounted rotatably in the slot. Here, the sliding element is preferably embodied as a bolt, in particular as a roller. This XY table configuration is distinguished by a simple construction, especially of the joint, which is formed by a slotted guide.

A linear transport system having a robot described above and having an XY table described above can have a carriage guide rail having an arc section, wherein, in particular, the guide rail can form a closed path. In this way, a circulating transport movement can be performed, wherein flexible introduction and removal of workpieces by means of the robot is possible.

According to one embodiment, the linear transport system is designed in such a way that the carriage guide rail is arranged on a stator, which has an in-series arrangement of individually energizable coils. Each carriage comprises at least one permanent magnet, which is designed to interact with the magnetic field formed by the in-series arrangement of individually energizable coils. By means of this configuration, a linear transport system is possible in which the robot can be controlled precisely and with high accuracy, wherein all axis movements are brought about by variations of the traveling field, equivalent to a rotating field, along the carriage guide section.

BRIEF DESCRIPTION OF THE DRAWINGS

The invention will be discussed in more detail below on the basis of figures. Here, in a schematic illustration in each case:

FIG. 3 and FIG. 4 show plan views of the robot embodiment shown in FIG. 1 with a first and a second position in the x and y direction;

FIG. 5 and FIG. 6 show side views of the robot embodiment shown in FIG. 1 with a first and second position in the z direction;

FIG. 13 and FIG. 14 show a plan view and a perspective bottom view of a linear transport system having two XY table embodiments;

FIG. 15 and FIG. 16 show perspective detail views of the two XY table embodiments shown in FIG. 13 and FIG. 14;

FIG. 17 and FIG. 18 show a plan view and a side view of a linear transport system having another XY table embodiment;

DETAILED DESCRIPTION

Figure 1:
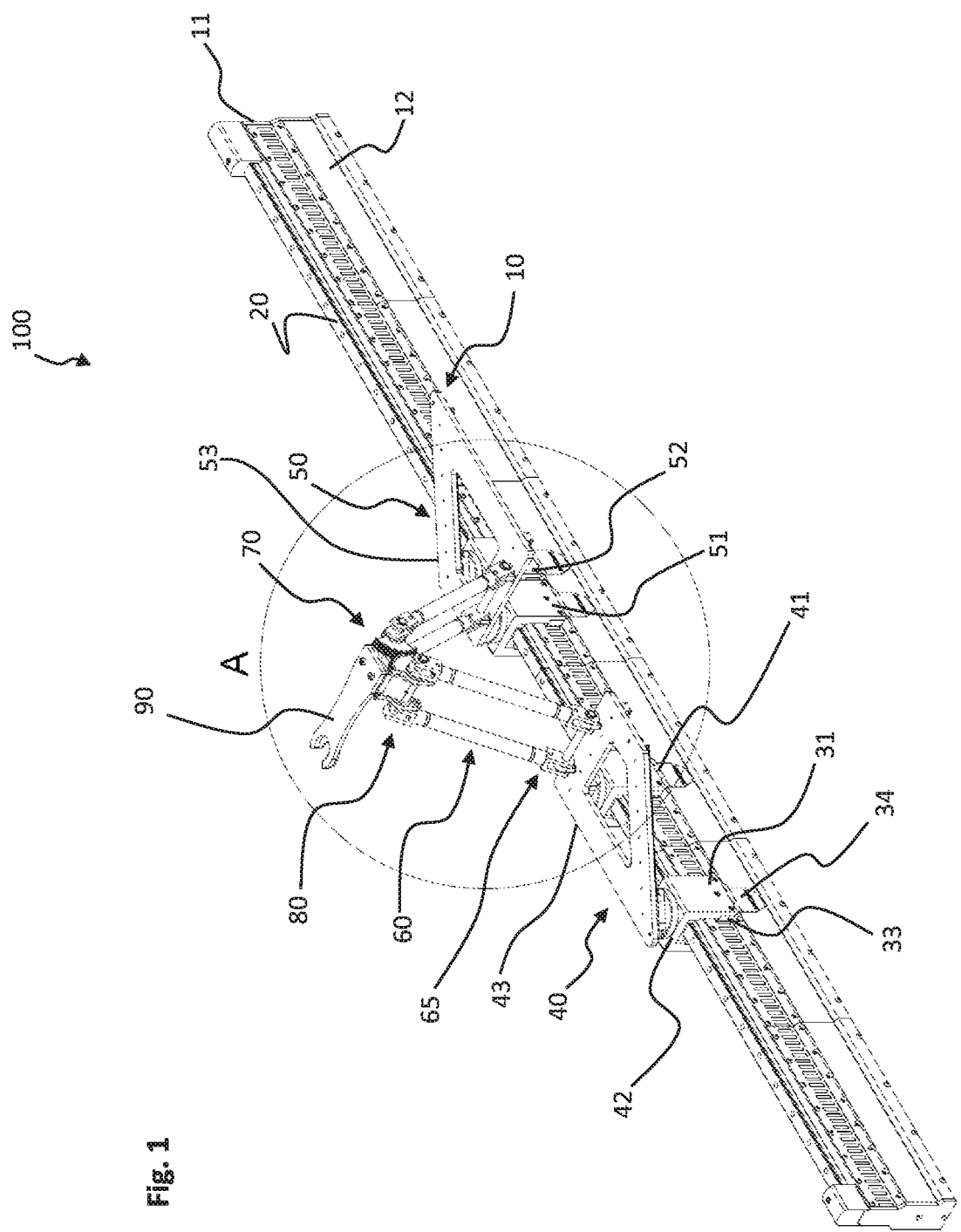
FIG. 1 shows, in perspective view, a first robot embodiment for a linear transport system having a carriage guide rail.

In production and manufacture, especially with distributed processing stations, transport systems play an important role. One significant aim here is to achieve high flexibility in the transportation of the workpieces to be processed between the individual processing stations. Linear transport systems, in which a plurality of carriages that can be moved independently of one another can be moved along a guide, are suitable for this purpose, in particular.

Linear transport systems are preferably configured in such a way that the motor is arranged on the movement path, whereas the carriages are embodied in a passive way without cables. With such linear drive systems, long transport distances can be achieved. Moreover, it is then also possible to form a closed path in order to implement a circulating transportation movement. The invention is explained below with reference to a linear transport system of this kind having a motor configured as a movement path and transport carriages without cables. However, there is also the possibility to use a different linear transport system, in which the motor is arranged in the transport carriages. In addition to the electric drive explained, it is also possible to use a drive system of a different kind, e.g. a hydraulic or pneumatic drive.

As a motor, the linear transport system preferably has a stator, which comprises an in-series arrangement of individually energizable coils. In this case, the stator is designed in accordance with the desired movement path and carries a carriage guide rail. The transport carriages, also referred to below as carriages, which are each provided with permanent magnets, are arranged on the carriage guide rail. A position detector, which is preferably integrated in the stator, is furthermore provided. The signals from the position detector are transmitted via a communications link to a control unit. From the position signals, the control unit determines the position and speed of the individual transport carriages on the carriage guide rail. By means of dynamic control of the individual stator coils by the control unit along the movement path, a dedicated magnetic traveling field is produced for each transport carriage in order to bring about a desired traveling movement of the carriage. The linear transport system thus makes it possible to position each individual carriage exactly within microseconds in a time-synchronized way and under position and speed control.

In order to be able to introduce and remove workpieces in the area of processing stations, four carriages of the linear transport system are coupled to form a robot structure, which allows a movement in a three-dimensional workspace. In order to be able to adopt any desired position in the three-dimensional workspace, all that is required here is the individual control of the four carriages along a single carriage guide rail.

Here, the robot is made up of two XY tables, which are each constructed from two carriages that can be moved independently of one another on the carriage guide rail. In this case, each XY table has two linear guides, which are embodied with an angular offset with respect to one another. Each linear guide comprises a first and a second guide element, wherein the two first guide elements are connected to one another via a support structure. Here, the second guide element of one linear guide is connected to one carriage, and the second guide element of the other linear guide is connected to the other carriage.

With this construction, each of the two single-axis linear guide systems of the XY tables is assigned to one carriage, which can be controlled and moved independently. By synchronous movement of the two carriages of the XY table, the XY table can perform a movement along the carriage guide rail, i.e. in the x direction. By means of a movement of the two carriages of the XY table relative to one another, during which the distance between the carriages is modified, the support structure can then be moved along the linear guides transversely to the carriage guide rail. The two XY tables can thus perform a two-dimensional movement in a workspace defined by the length of the carriage guide rail and the length of the two linear guides.

The robot furthermore has a first and a second arm system, which are connected to one another via an articulated system which carries a work tool. Here, one arm system is connected by means of a first joint to the support structure of one XY table and the other arm system is connected by means of a further joint to the support structure of the other XY table. By means of a movement of the two XY tables relative to one another, the angle between the two arm systems and hence of the work tool on the articulated system can be modified perpendicularly to the carriage guide rail, and, by means of the movement of the carriages of the two XY tables, it is therefore also possible to position the robot in the z direction.

In addition to the three translational degrees of freedom, there is the possibility of achieving an additional rotary degree of freedom by means of a rotatable configuration of the fastening of the two arm systems on the support structure of the two XY tables.

Figure 2:
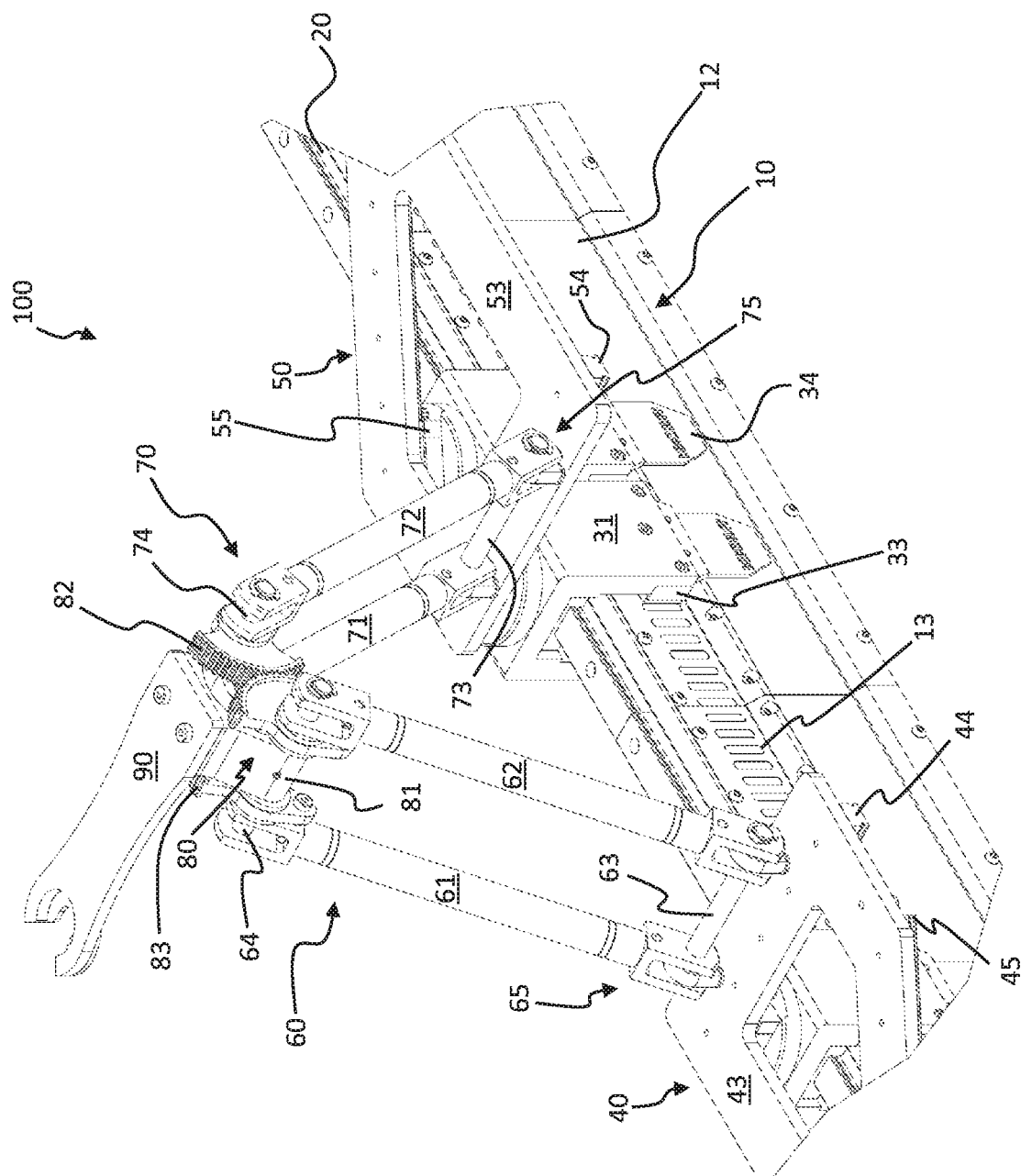
FIG. 2 shows a detail view of the robot embodiment shown in FIG. 1.

FIGS. 1 and 2 show a first embodiment of a robot 100 for a linear transport system, which can perform a movement in the three spatial directions. In this case, the linear transport system is made up of a plurality of motor modules—of six motor modules 10 in the embodiment shown in FIG. 1—which form the movement path when lined up in a row. Here, as shown in FIG. 1, the motor modules can be of straight or of arcuate configuration. By appropriate assembly of straight and arcuate motor modules, it is possible to form any desired shape of the travel path, in particular a closed movement path.

As shown especially also by the detail view in FIG. 2, each motor module 10 has a coil region 11, which is arranged on a support region 12. The coil region 11 is made up of a series of transversely arranged coils 13, which are in each case connected for purposes of control to power electronics integrated into the support region 12. A position detector is furthermore provided in the wall of the support region 12. The motor modules 10 are connected to one another via contacting devices. A feed-in system, via which the data link to a control unit and attachment to a power supply are made, is furthermore provided.

Arranged on the coil region 11 of the motor modules 10 is a carriage guide rail 20, which is preferably likewise of modular construction and is segmented to correspond to the motor modules. However, the carriage guide rail 20 can also extend over several motor modules 10. The geometry of the carriage guide rail 20 is matched to the running gear of the carriages guided on the carriage guide rail.

The robot 100 shown in FIGS. 1 and 2 is made up of two XY tables 40, 50, two arm systems 60, 70, an articulated system 80 and a work tool 90. The XY tables 40, 50 each have a double carriage arrangement, which serves as a drive for the respective XY table. The carriages 41, 42, 51, 52 of the two double carriage arrangements have a carriage support profile 31 of U-shaped cross section which fits around the carriage guide rail 20 and the coil region 11 of the motor module 10 situated therebelow. Arranged within the carriage support profile 31, in the region of the carriage guide rail 20, is a running roller system as running gear, the configuration of which is matched to the geometry of the carriage guide rail 20, thereby giving good running characteristics and low wear. As an alternative, it is also possible for a system comprising suitable sliding elements as running gear to be brought into engagement with the carriage guide rail 20, instead of the running roller system.

Opposite the coil region 11 of the motor modules 10, the carriage support profiles 31 each have permanent magnets 33 on the inside thereof. The permanent magnets 33 interact with the coil region 11 of the motor modules 10, wherein, through interaction with the permanent magnets 33, the magnetic traveling field formed by the coils 13 exerts a propulsive force on the carriages 41, 42, 51, 52, by means of which the position and speed of the carriages can be controlled.

A transmitter tab 34, which lies opposite the position detector in the support region 12 of the motor module 10, is furthermore arranged on the carriage support profile 31. The position detector in the motor module 10 is configured as an inductive sensor system, in which the transmitter tab 34 causes a disturbance, which is then converted into a position signal by the position detector in the support region 12 of the motor module 10. This signal is transmitted to the control unit of the linear transport system in order to determine the position and speed of the carriage.

The XY tables 40, 50 shown in FIGS. 1 and 2 each have a support structure 43, 53, which are connected to a first and a second linear guide 44, 45, 54, 55. Here, the support structure 43, 53 is configured as a planar frame in the form of a convex quadrilateral with a front bar oriented perpendicularly to the carriage guide rail 20. The support structures 43, 53 of the two XY tables 40, 50 are oriented in such a way that the front bars lie opposite one another. There is the possibility, instead of a frame with an internal opening as a support structure, of providing a continuous plate or, alternatively, a shape of a fundamentally different design, which is matched to the design of the arm systems and is preferably of weight-optimized configuration.

The first and the second linear guide 44, 45, 54, 55 of the two XY tables 40, 50 are each made up of a first guide element, configured as a guide rail, and a second guide element, configured as a sliding element. Linear guides of this type are sufficiently well known from the prior art. The two guide rails are arranged on the underside of the support structure 43, 53 and are mounted with an angular offset with respect to one another. In order to achieve a large XY range of movement, the first linear guide 44, 54 is mounted parallel to the front bar of the support structure 43, 53 configured as a frame, as FIGS. 1 and 2 show. In contrast, the second linear guide 45, 55 extends diagonally across the underside of the support structure 43, 53 along the rear bar. The sliding element of the first linear guide 44, 54 is arranged on the carriage support profile 31 of the first carriage 41, 51 of the double carriage arrangement, and the sliding element of the second linear guide 45, 55 is arranged on the carriage support profile 31 of the second carriage 42, 52 of the double carriage arrangement.

In the embodiment shown in FIGS. 1 and 2, the geometry of the carriage guide rail 20 is straight. The first and the second linear guides 44, 45, 54, 55 can therefore be connected in a fixed manner to the support structure 43, 53 or the carriage support profiles 31 of the XY tables 40, 50. In the case of a curved embodiment of the carriage guide rail, at least the first or the second linear guide is then connected rotatably to the support structure of the XY table or to the carriage support profile. The preference here is for the sliding element of the linear guide, the guide rail of which is arranged obliquely on the support structure of the XY table, to be of rotatable configuration. However, there is also the possibility of connecting the guide rail of the linear guide, rather than the sliding element, rotatably to the support structure.

The two arm systems 60, 70 of the robot construction shown in FIGS. 1 and 2 are each shaped as a two-dimensional object that forms a surface. In the embodiment shown in FIGS. 1 and 2, the two-dimensional object forming the arm system is made up in each case of two rods 61, 62, 71, 72, which are connected to one another by upper and lower rods 63, 64, 73, 74. In this case, the rods 63, 64, 73, 74 can be connected rigidly or rotatably to the two rods 61, 62, 71, 72.

The arm system 60, 70 is in each case coupled to the support structure of the associated XY table via a pivot joint 65, 75. In the embodiment shown in FIGS. 1 and 2, the pivot joint 65, 75 is formed by two lugs, which are each arranged on the front bar of the support structure 43, 53, in which the lower rod 63, 73 of the arm system 60, 70 is rotatably mounted. Alternatively, there is also the possibility of using joints of different configuration, e.g. ball joints. The joint can furthermore be arranged at any desired point on the support structure of the associated XY table.

An articulated system 80, which connects the first and the second arm system 60, 70, has a support 81 with two holes, through which the upper rod 64, 74 of the two arm systems extends in each case. A respective gear mechanism 82, 83 comprising two half shells is provided laterally on both sides of the support 81.

A work tool 90 in the form of a gripper, by means of which a workpiece can be gripped, is arranged on the support 81 of the articulated system 80. However, the work tool 90 arranged on the articulated system 80 can have any desired shape matched to the process to be carried out or the workpiece to be moved. It is also possible for the work tool 90 to have a drive, e.g. for an actuator. As an alternative, it would also be possible, for example, for the work tool to accommodate a drilling head, an adhesive nozzle (a type of hot adhesive gun) or a sensor, which records the surface roughness or temperature of workpieces, for example.

FIGS. 3, 4, 5 and 6 show the robot 100 illustrated in FIGS. 1 and 2 in various positions. Here, FIGS. 3 and 4 are each plan views of the robot 100, wherein the XY tables 40, 50 have each been moved sideways to the maximum extent relative to the carriage guide rail 20. The positioning of the two XY tables 40, 50 of the robot 100 in the y direction is accomplished by means of a movement of the two carriages of the associated double carriage arrangement relative to one another. In the first maximum position in the y direction, which is shown in FIG. 3, the two carriages 41, 42 of the first XY table 40 have been moved apart to the maximum extent, and the two carriages 51, 52 of the second XY table 50 have been positioned at the minimum distance apart. In the second maximum position in the y direction, which is shown in FIG. 4, the distance between the carriages 41, 42, 51, 52 of the respective XY tables 40, 50 is precisely the opposite to that in FIG. 3.

FIGS. 5 and 6 show side views of the robot 100, in which positioning of the work tool 90 of the robot 100 is performed in the z direction perpendicularly to the carriage guide rail 20. In the positions of the XY tables 40, 50 which are shown in FIGS. 5 and 6, the relative positions of the two carriages of the respective XY tables 40, 50 remain the same, whereas the two XY tables 40, 50 are moved relative to one another. Owing to the modified distance between the two XY tables 40, 50, the angle between the two arm systems 60, 70 and therefore the distance between the work tool 90 arranged on the articulated system 80 and the carriage guide rail 20 in the z direction are varied.

The two lateral gear mechanisms 82, 83 of the articulated system 80 ensure that the work tool 90 is prevented from tilting as the XY tables 40, 50 move apart. As an alternative to the gear mechanisms 82, 83, there is also the possibility, by configuring the coupling of the two pivot joints of the articulated system 80 differently, of holding the work tool 90 stable on the articulated system 80 during a movement of the robot 100.

The robot 100 illustrated in FIGS. 1 to 6 for a linear transport system is distinguished by a simple construction and can be positioned as desired with little control effort in a three-dimensional workspace. With the aid of four carriages, which are arranged on a single carriage guide rail and can be controlled separately, a three-axis motion of the work tool can be performed, in which any desired position in a three-dimensional workspace can be adopted.

Figure 7:
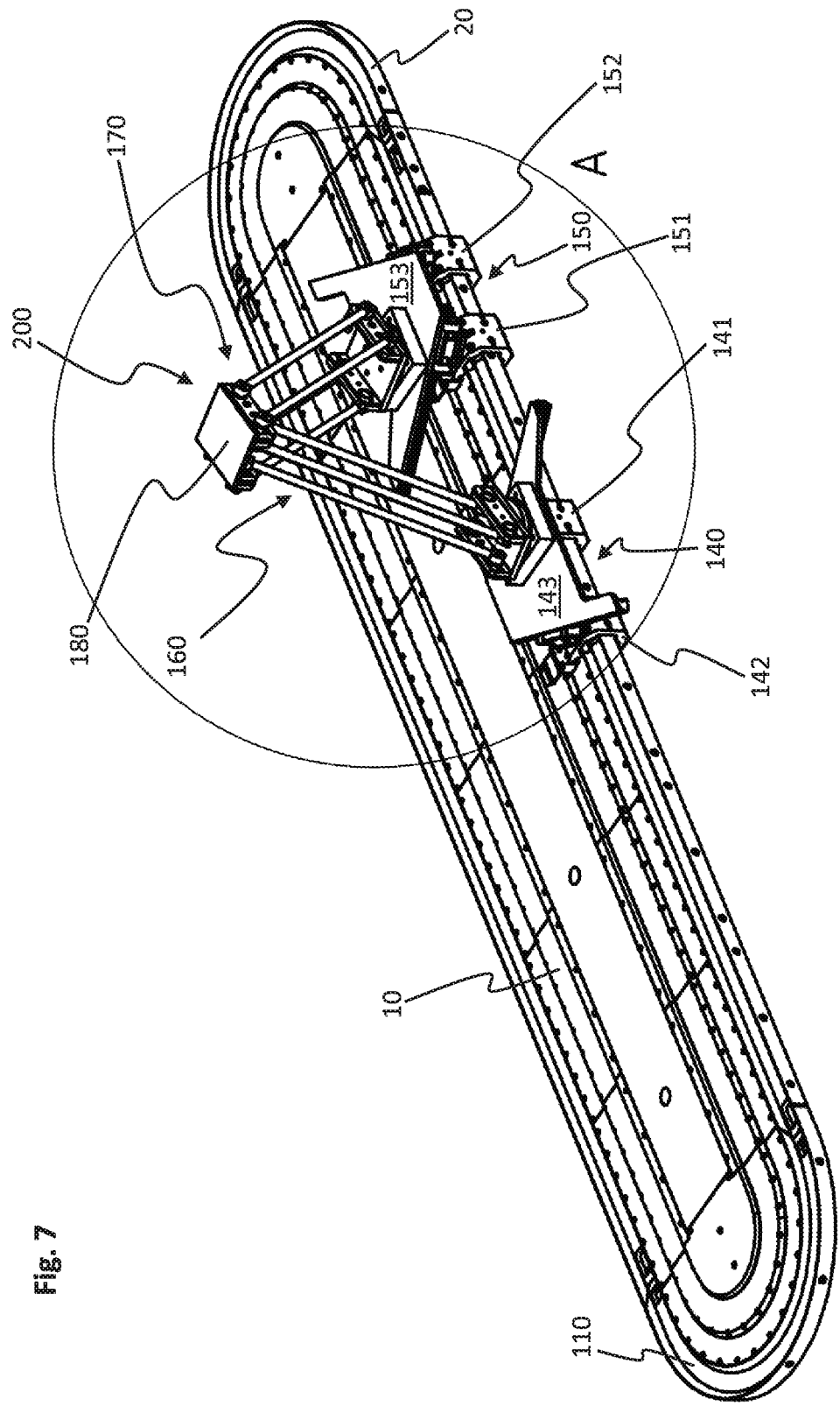
FIG. 7 shows, in a perspective view, a second robot embodiment for a linear transport system having a carriage guide rail.
Figure 8:
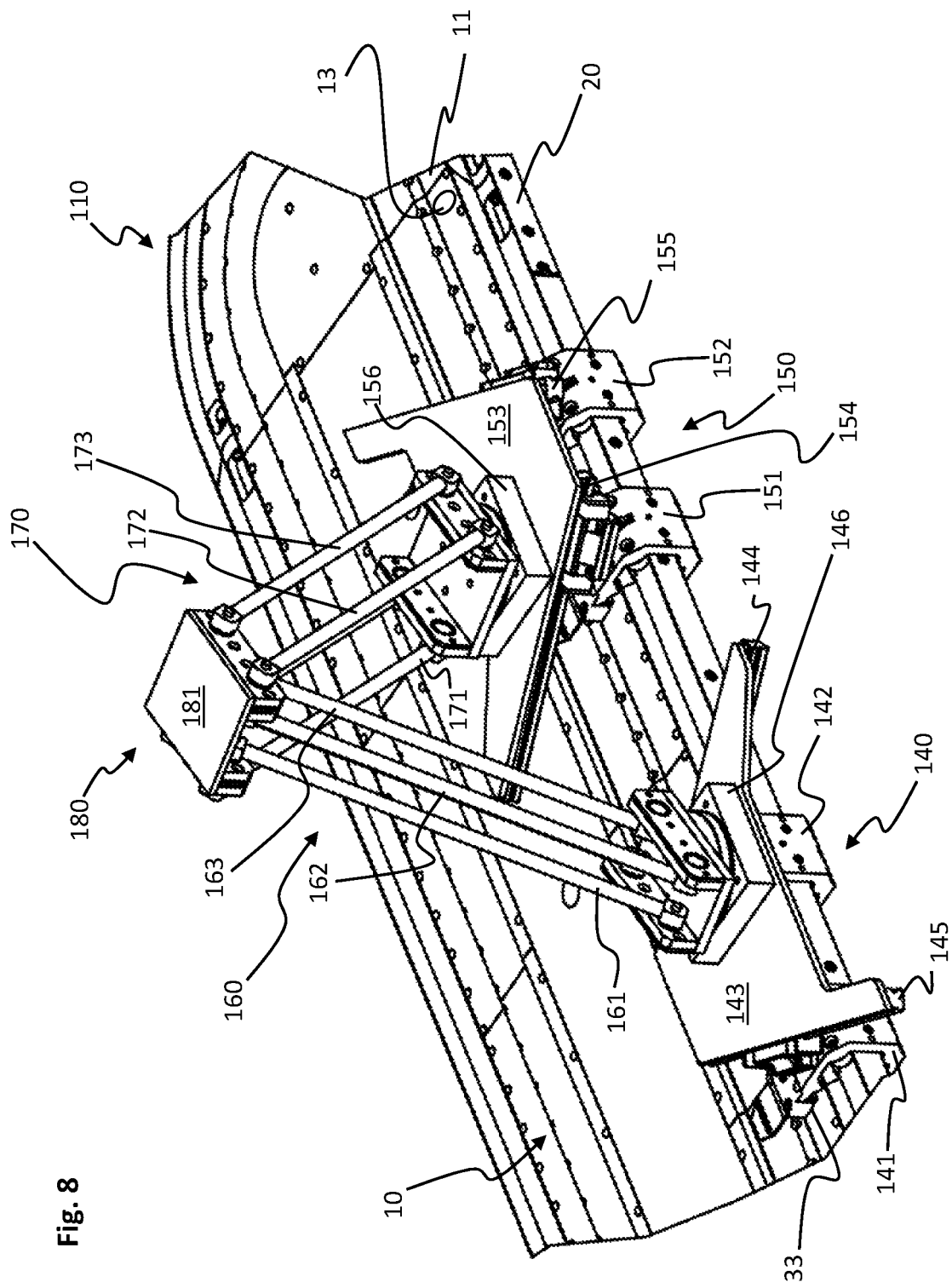
FIG. 8 shows a detail view of the robot embodiment shown in FIG. 7.

FIGS. 7 and 8 show a second embodiment of a robot 200 for a linear transport system. Only the differences with respect to the robot construction shown in FIGS. 1 and 2 are explained below.

FIG. 7 shows a linear transport system with a closed carriage guide rail 20. The linear transport system has two curved motor modules 110 with respective straight motor modules 10 situated between them. The motor modules 10, 110 are arranged horizontally, wherein the two XY tables 140, 150 are moved parallel to the plane of the path of the motor modules 10, 110. A first and a second linear guide 144, 145, 154, 155 of the two XY tables 140, 150 are aligned parallel to the plane of the path. For this purpose, as shown in FIGS. 7 and 8, the first and the second linear guide 144, 145, 154, 155 are arranged laterally on a carriage support profile 143, 153 of the first and the second carriage 141, 142, 151, 152 of the respective XY table 140, 150.

In other respects, the construction of the XY table 140, 150 corresponds substantially to the construction of the XY table as explained in connection with the embodiment shown in FIGS. 1 and 2. In contrast to the XY tables 40, 50 shown in FIGS. 1 and 2, however, the two guide rails of the two linear guides 144, 145, 154, 155 are each arranged obliquely to the carriage guide rail 20 on the support structure 143, 153 of the XY tables 140, 150. The support structure 143, 153 of the XY tables 40, 150 is also formed as a continuous plate, wherein a first and a second arm system 160, 170 of the robot 200 are arranged centrally on the support structure. To enable the XY tables 140, 150 to travel around a bend, at least one of the two linear guides 144, 145, 154, 155 is connected rotatably to the associated carriage 141, 142, 151, 152 or the support structure 143, 153. Here, the positioning of the XY tables 140, 150 in relation to the carriage guide rail 20, i.e. a movement in the y direction, is accomplished in the same way as with the XY table configuration shown in FIGS. 1 and 2, namely by means of a relative movement of the two carriages of the XY table.

One significant difference with the embodiment of the robot 200 in FIGS. 7 and 8 in comparison with the embodiment shown in FIGS. 1 and 2 is in the configuration of the two arm systems 160, 170, however. The two arm systems 160, 170 are each configured as three-dimensional objects, which each have a three-point connection to an articulated system 180 and the support structure 143, 153 of the associated XY table 140, 150. Each arm system 160, 170 is made up of 3 rods 161, 162, 163, 171, 172, 173 arranged parallel to one another, which with their ends each form an independent triangular base area in the region of the support structure 143, 153 of the associated XY table 140, 150 and a common triangular work area in the region of the articulated system 180.

A pivot joint 146, 156, which has two plates mounted rotatably relative to one another, is furthermore provided between the arm system 160, 170 and the support structure 143, 153 of the associated XY table 140, 150. In this arrangement, one plate of the pivot joint 146, 156 is connected to the support structure 143, 153 of the XY table 140, 150. The other plate of the pivot joint 146, 156 has a pivot joint at each of three corners of the plate, the joints being connected respectively to an end section of one of the three rods 161, 162, 163, 171, 172, 173 of the arm system 160, 170. As an alternative to a pivot joint, it is also possible to use a joint configured in a different way, e.g. a ball joint.

The other end section of the three rods 161, 162, 163, 171, 172, 173 of the first and of the second arm system 160, 170 is in each case connected to the articulated system 180. The articulated system 180 has a support plate 181, which at each of the four corners has a joint, in the embodiment shown a pivot joint. The respective rods 161, 162, 163, 171, 172, 173 of the first and of the second arm system 160, 170 are mounted rotatably in these four pivot joints, wherein a respective rod of the first and of the second arm system 160, 170 is arranged at two opposite corners.

A work tool of any desired shape, e.g. the work tool 90 shown in FIGS. 1 and 2, can be arranged on the support plate 181 of the articulated system 180. The robot configuration 200 shown in FIGS. 7 and 8 allows not only a translational motion in the three spatial directions but also, in addition, a rotary motion and thus has four degrees of freedom. The additional rotary motion too is once again brought about simply by moving the four carriages 141, 142, 151, 152 assigned to the two XY tables 140, 150.

Figure 9:
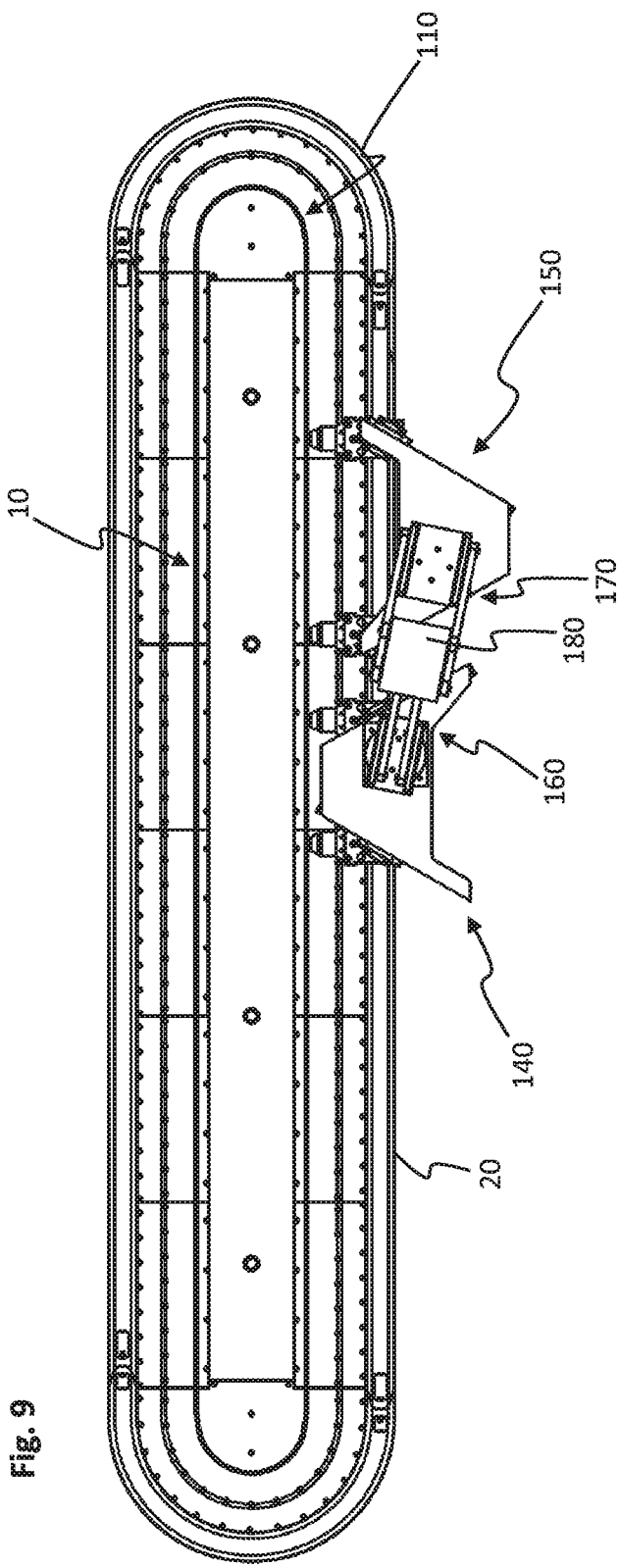
FIG. 9 and FIG. 10 show a plan view and a side view of the robot embodiment shown in FIG. 7 in a first rotated XY position.
Figure 10:
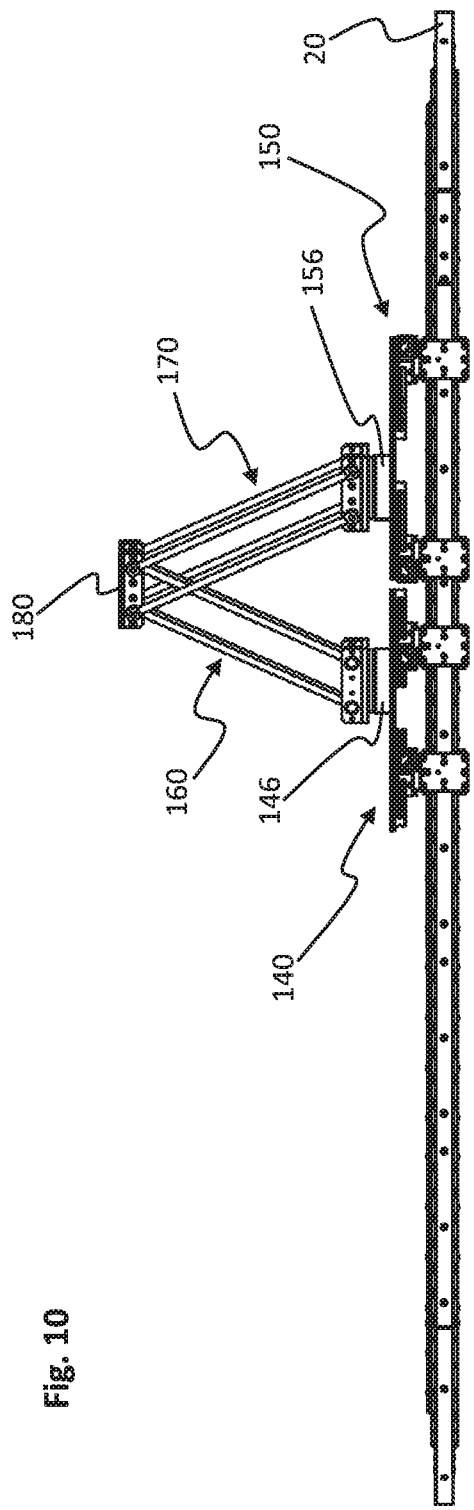
Figure 11:
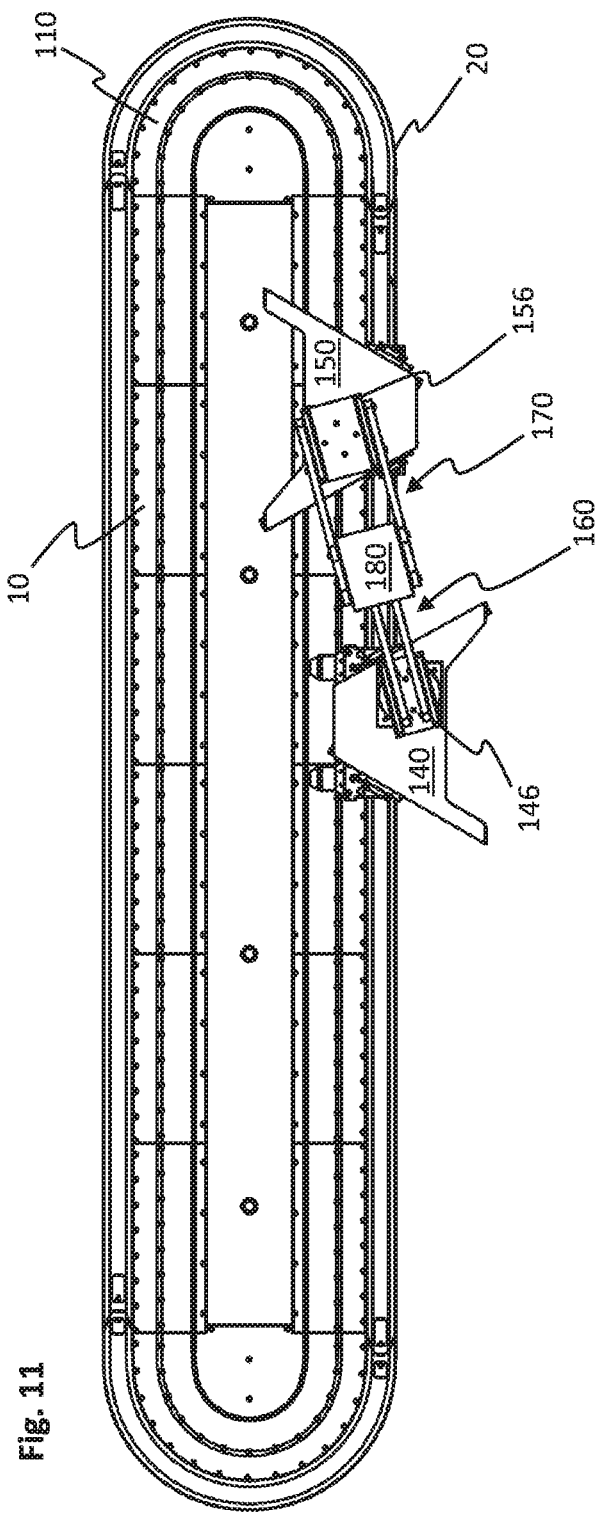
FIG. 11 and FIG. 12 show a plan view and a side view of the robot construction shown in FIG. 7 in a second rotated XY position.
Figure 12:
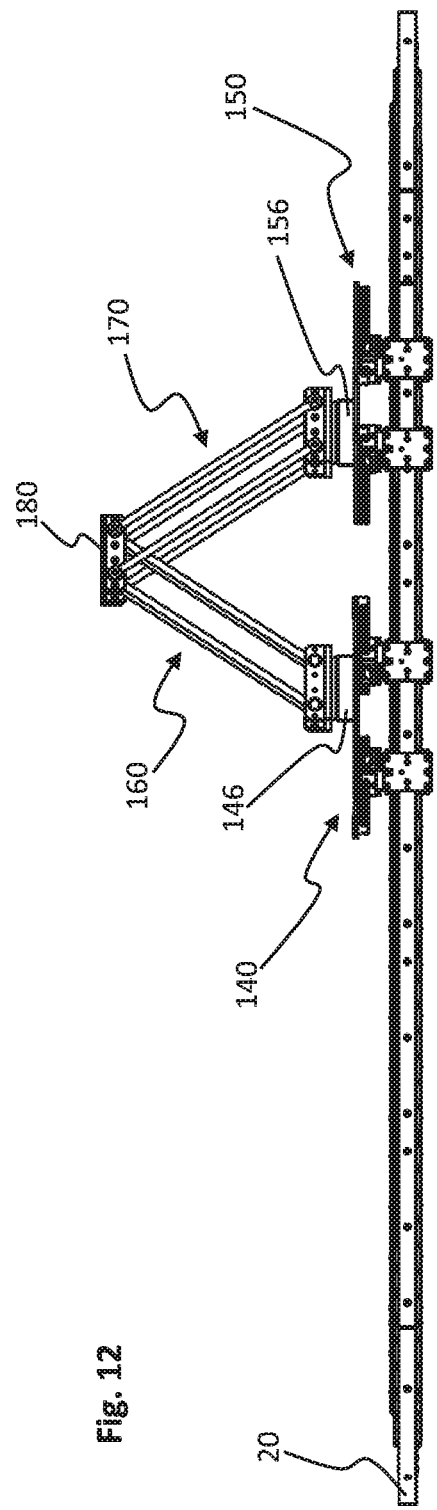

FIGS. 9 to 12 show the robot embodiment 200 illustrated in FIGS. 7 and 8 in two different positions produced by the additional rotary motion. Here, FIG. 9 shows a plan view and FIG. 10 a side view of a first rotated position, and FIG. 11 shows a plan view and FIG. 12 a side view of a second rotated position.

In respect of a movement in the y direction, the XY table 140 is in a virtually central position between its two maximum possible positions in the y direction, as the plan view in FIG. 9 shows. In contrast, the XY table 150 has been moved sideways to the maximum extent, i.e. in the y direction toward the carriage guide rail 20, wherein the two XY tables 140, 150 have been moved in opposite directions with respect to the X direction defined by the carriage guide rail 20. The displaced position of the two XY tables 140, 150 relative to one another leads to a rotary motion of the two arm systems 160, 170 of the robot 200, imparted by the respective pivot joint 146, 156 arranged between the support structure 143, 153, the XY table 140, 150 and the associated arm system 160, 170. In comparison with the plan view in FIG. 9, the plan view in FIG. 11 then shows the opposite positioning of the XY table 150 of the robot 200 in relation to the carriage guide rail 20, this leading to precisely the opposite rotation of the arm systems 160, 170 of the robot.

Further possible variants of the XY table for a robot of the kind explained above by means of two embodiments are shown in FIGS. 13 to 20. All the XY tables are configured to move on a closed linear transport system, in which the motor modules are arranged flat, as illustrated in FIGS. 7 and 8, and the support structure of the XY table is positioned laterally, parallel to the motor modules. In principle, however, there is also always the possibility of guiding the support structure of the XY tables along the front face of the carriage guide rail 20 of the motor modules, as illustrated in the embodiment in FIGS. 1 and 2. In order then to allow the XY table to travel around a bend, it is then necessary, however, that the first and the second linear guide of the XY table be connected tiltably to the first and second carriage, respectively. Such a tilting movement can be enabled with the aid of two rotating bases of U-shaped cross section, for example, which each fit around the support profile of the first and second carriage, respectively, and are arranged for conjoint rotation about a center of rotation at the two side faces. The two linear guides of the associated XY table are then arranged on the front faces of the rotary bases.

FIG. 13 shows, in plan view, and FIG. 14 shows, in perspective view from below, two XY table configurations, wherein one XY table configuration corresponds to XY table 140, which is used in the robot construction illustrated in FIGS. 7 and 8. FIG. 16 shows a perspective detail view of this XY table configuration.

Figure 15:
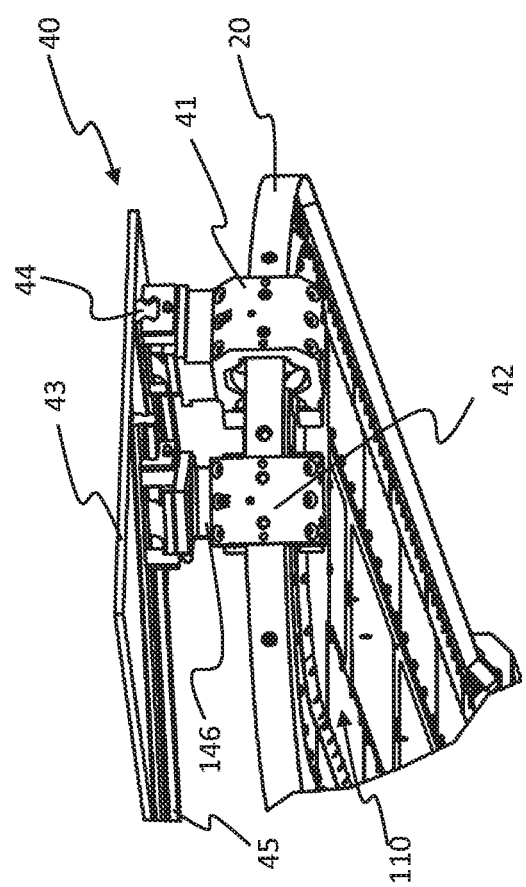

The other XY table 40 shown in FIGS. 13 and 14 corresponds substantially to the XY table 40 described in the context of the robot configuration shown in FIGS. 1 and 2. FIG. 15 shows a detail view of this XY table configuration. In contrast to this XY table 40, however, the support structure 43 of the XY table 40 is configured as a continuous plate. In principle, there is the possibility of adapting the support structure 43 of the XY table 40, in particular, in a weight-optimized manner and matched to the configuration of the robot arms or the rotary fastening to these robots arms. Since the carriage guide rail 20 in FIGS. 13 and 14 has curved regions, the XY table 40, 140 must in all cases have a linear guide 44, 45, 144, 145 and at least one pivot joint 146, 156 for connection to the associated carriages 41, 42, 141, 142 or support structure 43, 143. As an alternative to a pivot joint, the use of a joint configured in some other way, e.g. a ball joint, is also possible.

Figure 19:
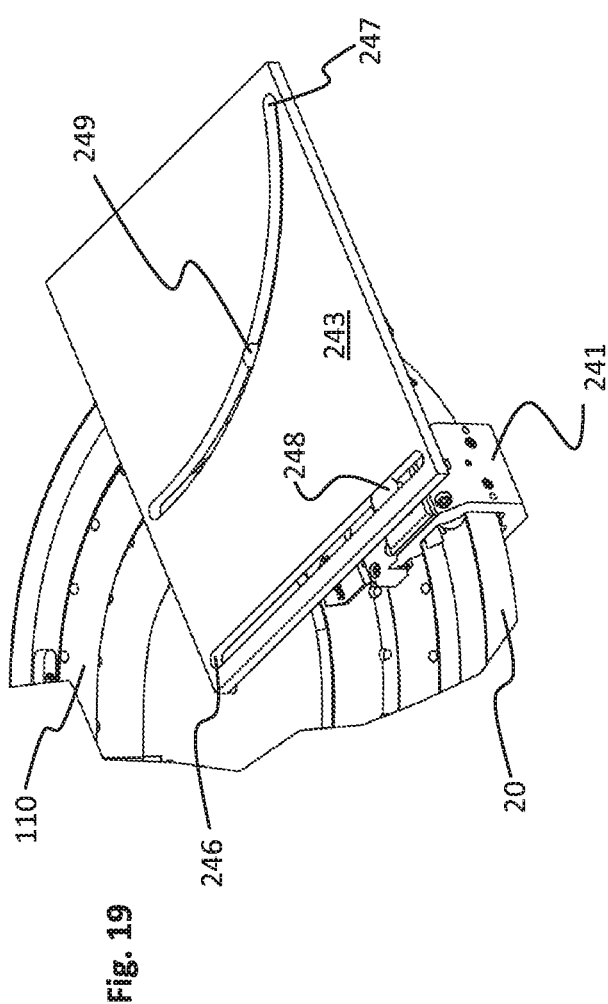
FIG. 19 and FIG. 20 show perspective detail views of the XY table embodiment shown in FIG. 17 and FIG. 18.
Figure 20:
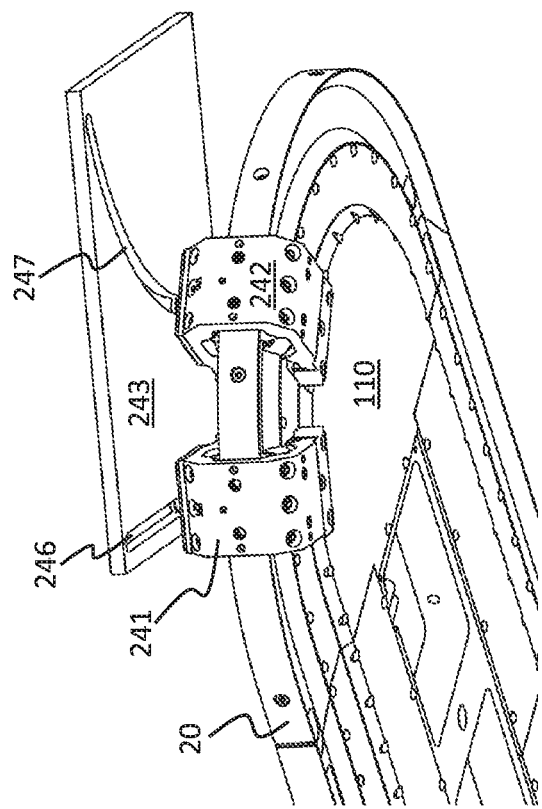

Another possible variant of an XY table 240 is shown in FIGS. 17 to 20, wherein FIG. 17 shows the XY table 240 on a closed linear transport system in plan view, and FIG. 18 shows it in side view. FIGS. 19 and 20 are each detail views of the XY table 240, viewed in perspective from above and from below.

This embodiment of the XY table 240 differs from the XY tables already explained in the configuration of the two linear guides 244, 245 of the XY table 240, which are designed as slotted guides. The linear guides 244, 245 each have, as a guide rail, a slot 246, 247, in which a sliding pin 248, 249 is arranged as a sliding element of the linear guide. As FIGS. 17, 19 and 20 show, the slots 246, 247 of the two linear guides 244, 245 are formed as open slits directly in a support structure 243 of the XY table 240. However, there is also the possibility of providing the slot as a recess in the support structure 243 or in an additional element.

To allow an XY motion of the table, the slots 246, 247 slope relative to one another, wherein the slot shape can be varied and, as shown in the embodiment, can be configured as a straight line, as per slot 246, or as an arc, as per slot 247. However, it is also possible, for example, for the slots to be formed as a circular segment or as part of a Gaussian curve. In this context, the slot shape can be matched in an optimum manner to the desired XY motion of the XY table 240 and to the configuration of the carriage guide rail 20 of the linear transport system.

In order to allow travel of the XY table 240 around a bend, it is necessary, as explained, that a linear guide 244, 245 is designed to be rotatable in relation to the support structure 243 or the associated carriage 241, 242. In the case of a linear guide 244, 245 in the form of a slotted guide, as envisaged for XY table 240, this can be achieved by means of a rotatable configuration of the sliding pin 248, 249. Here, as FIGS. 17 to 20 show, the sliding pin 248, 249 of rotatable configuration is preferably arranged in the curved slot 247 and, in the simplest embodiment, can be a fixed bolt which extends through the slot 247. To achieve movement of the bolt in the slot 247 with as little wear as possible, the bolt can furthermore be rotatably mounted on the carriage 242, e.g. in the form of a roller. In contrast, the sliding pin 249 inserted as a sliding element into the straight groove 246 can be connected rigidly to the carriage 241 and, as FIG. 19 in particular shows, can have the shape of an ellipse in cross section. However, there is also the possibility of using sliding blocks 248, 249 with a different shape.

The XY table 240 with linear guides 246, 247 in the form of slotted guides is mechanically of particularly simple construction and can therefore be produced at low cost. There is also the possibility of using a linear guide configured as a slotted guide in combination with a linear guide of some other kind, as described in the context of the other XY tables. All the XY table embodiments explained can furthermore be used with the robot embodiments described above.

LIST OF REFERENCE DESIGNATIONS

Reference designations:
10 motor module
110 curved motor module
11 coil region
12 support region
13 coil
20 carriage guide rail
31 carriage support profile
33 permanent magnet
34 transmitter tab
40, 140, 240 XY table
41, 141, 241 carriage
42, 142, 242 carriage
43, 143, 243 support structure
44, 144, 244 linear guide
45, 145, 245 linear guide
50, 150 second XY table
51, 151 carriage
52, 152 carriage
53, 153 support structure
54, 154 linear guide
55, 155 linear guide
60, 160 arm system
61, 62, 161, 162, 163 rod
63, 64 rod
65, 75 pivot joint
70, 170 arm system 71, 72, 171, 172, 173 rod
73, 74 rod
80, 180 articulated system
81, 181 support
82, 83 gear mechanism
90 work tool
100, 200 robot
146, 156 pivot joint
246, 247 guide slot
248, 249 sliding pin This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A robot for a linear transport system comprising a carriage guide rail which has an arc section, having:
    a first and a second XY table, each having a first and a second carriage, which are each arranged in such a way as to be movable independently of one another on the carriage guide rail, and
    a first and a second linear guide, which each have a first and a second guide element, which can be moved relative to one another along a path;
    wherein the first and the second linear guide are configured with an angular offset with respect to one another,
    wherein the first guide elements of the first and the second linear guide are connected to one another via a support structure,
    wherein the second guide element of the first linear guide is connected to the first carriage, and the second guide element of the second linear guide is connected to the second carriage; a first and a second arm system, which are connected to one another via an articulated system, and
    wherein the first arm system is connected to the support structure of the first XY table via a first joint, and the second arm system is connected to the support structure of the second XY table via a second joint; and a work tool, which is connected to the articulated system,
    wherein a three-axis motion of the work tool is performed by moving the first and the second carriage of the first XY table and the first and the second carriage of the second XY table, each carriage being controlled separately, wherein at least one of the first and second linear guides is connected rotatably to the associated carriage or the support structure.

2. The robot as claimed in claim 1, wherein the first joint is rotatably mounted on the support structure of the first XY table, and the second joint is rotatably mounted on the support structure of the second XY table.

3. The robot as claimed in claim 1, wherein:
    the first and the second arm system are each configured as a two-dimensional object forming a surface, wherein the articulated system has a first joint for connection to the first arm system and a second joint for connection to the second arm system, and
    the first joint and the second joint are connected to one another by a coupling device.

4. The robot as claimed in claim 3, wherein the coupling device is a gear mechanism.

5. The robot as claimed in claim 1, wherein the first and the second arm system are each configured as a three-dimensional object which in each case has a three-point connection to the articulated system and the support structure of the associated XY table.

6. A linear transport system comprising a carriage guide rail having an arc section, and a robot, having:
    a first and a second XY table, each having a first and a second carriage, which are each arranged in such a way as to be movable independently of one another on the carriage guide rail, and
    a first and a second linear guide, which each have a first and a second guide element, which can be moved relative to one another along a path;
    wherein the first and the second linear guide are configured with an angular offset with respect to one another,
    wherein the first guide elements of the first and the second linear guide are connected to one another via a support structure, and
    wherein the second guide element of the first linear guide is connected to the first carriage, and the second guide element of the second linear guide is connected to the second carriage; and
    a first and a second arm system, which are connected to one another via an articulated system;
    wherein the first arm system is connected to the support structure of the first XY table via a first joint, and the second arm system is connected to the support structure of the second XY table via a second joint; and a work tool, which is connected to the articulated system,
    wherein a three-axis motion of the work tool is performed by moving the first and the second carriage of the first XY table and the first and the second carriage of the second XY table, each carriage being controlled separately, wherein at least one of the first and second linear guides is connected rotatably to the associated carriage or the support structure.

7. The linear transport system as claimed in claim 6, wherein the carriage guide rail forms a closed path.

8. The linear transport system as claimed in claim 6, wherein:
    the carriage guide rail is arranged on a stator, which has an in-series arrangement of individually energizable coils, and
    the carriages each comprise at least one permanent magnet, which is designed to interact with a magnetic field formed by the in-series arrangement of individually energizable coils.

9. The linear transport system as claimed in claim 6, wherein:
    the first linear and second linear guides of the first and second XY tables are configured as slotted guides,
    the first guide elements of the first and the second linear guide are each guide rails in the form of a slot and the second guide elements of the first and the second linear guide are each sliding elements in the form of a sliding pin, and
    the slots slope relative to one another, and wherein each of the first linear and second linear guides is rotatably connected to the associated carriage or to the support structure, in that the sliding pin of each linear guide is rotatably mounted in the respective slot of the linear guide.

10. The linear transport system as claimed in claim 9, wherein the slot in which the rotatably configured sliding pin is arranged is embodied as a curved slot.

11. The linear transport system as claimed in claim 10, wherein the sliding pin rotatably mounted in the curved slot is a bolt.

* * * * *